United States Patent
Zimmerman

(10) Patent No.: US 6,342,836 B2
(45) Date of Patent: Jan. 29, 2002

(54) PROXIMITY AND SENSING SYSTEM FOR BAGGAGE

(76) Inventor: Harry I. Zimmerman, 310 Comstock Ave., Los Angeles, CA (US) 90024

( * ) Notice: Subject to any disclaimer, the term of this patent is extended or adjusted under 35 U.S.C. 154(b) by 0 days.

(21) Appl. No.: 09/871,986

(22) Filed: May 31, 2001

Related U.S. Application Data

(63) Continuation-in-part of application No. 09/512,965, filed on Feb. 25, 2000, now Pat. No. 6,265,975, and a continuation-in-part of application No. 09/627,366, filed on Jul. 28, 2000.

(51) Int. Cl.$^7$ ............................................. G08B 13/14
(52) U.S. Cl. .............. 340/571; 340/309.15; 340/573.1; 340/825.04; 455/38.3
(58) Field of Search ..................... 340/571, 309.15, 340/573.1, 825.04; 455/38.3; 235/375, 384

(56) References Cited

U.S. PATENT DOCUMENTS

| | | | |
|---|---|---|---|
| 5,051,565 A | * 9/1991 | Wolfram | 235/384 |
| 5,313,052 A | * 5/1994 | Watanabe et al. | 235/375 |
| 5,689,239 A | * 11/1997 | Turner et al. | 340/572 |
| 5,793,639 A | * 8/1998 | Yamazaki | 364/478.14 |
| 5,804,802 A | * 9/1998 | Card et al. | 235/375 |

* cited by examiner

Primary Examiner—Daniel J. Wu
Assistant Examiner—Phung T Nguyen
(74) Attorney, Agent, or Firm—Curtis L. Harrington

(57) ABSTRACT

A communication system is provided which can be realized in a number of ways to facilitate baggage tracking and recovery. In the most rudimentary realization, the traveler receives a signal from transmitters placed in the baggage which can identify the presence of each item of baggage by a code number which may show either as the code number or as a user supplied personal designator for a particular item of luggage. The transmitter is inexpensive and low power but works well in the aircraft environment and causes no interference with aircraft control, communication or navigation equipment. Advanced versions of the invention include programmability and transponder control as well as enhanced audio signaling also include structure which can sense an aircraft environment based upon pressure, vibration and acceleration to provide control to portable electronic devices in response to sensing the take-off, cruise and landing conditions. Especially useful are aircraft takeoff and landing footprints as predetermined pressure profiles over time. The footprints insure that the proper conditions are met for shutting down equipment, reducing the activity level of the equipment, or turning the equipment back on.

11 Claims, 10 Drawing Sheets

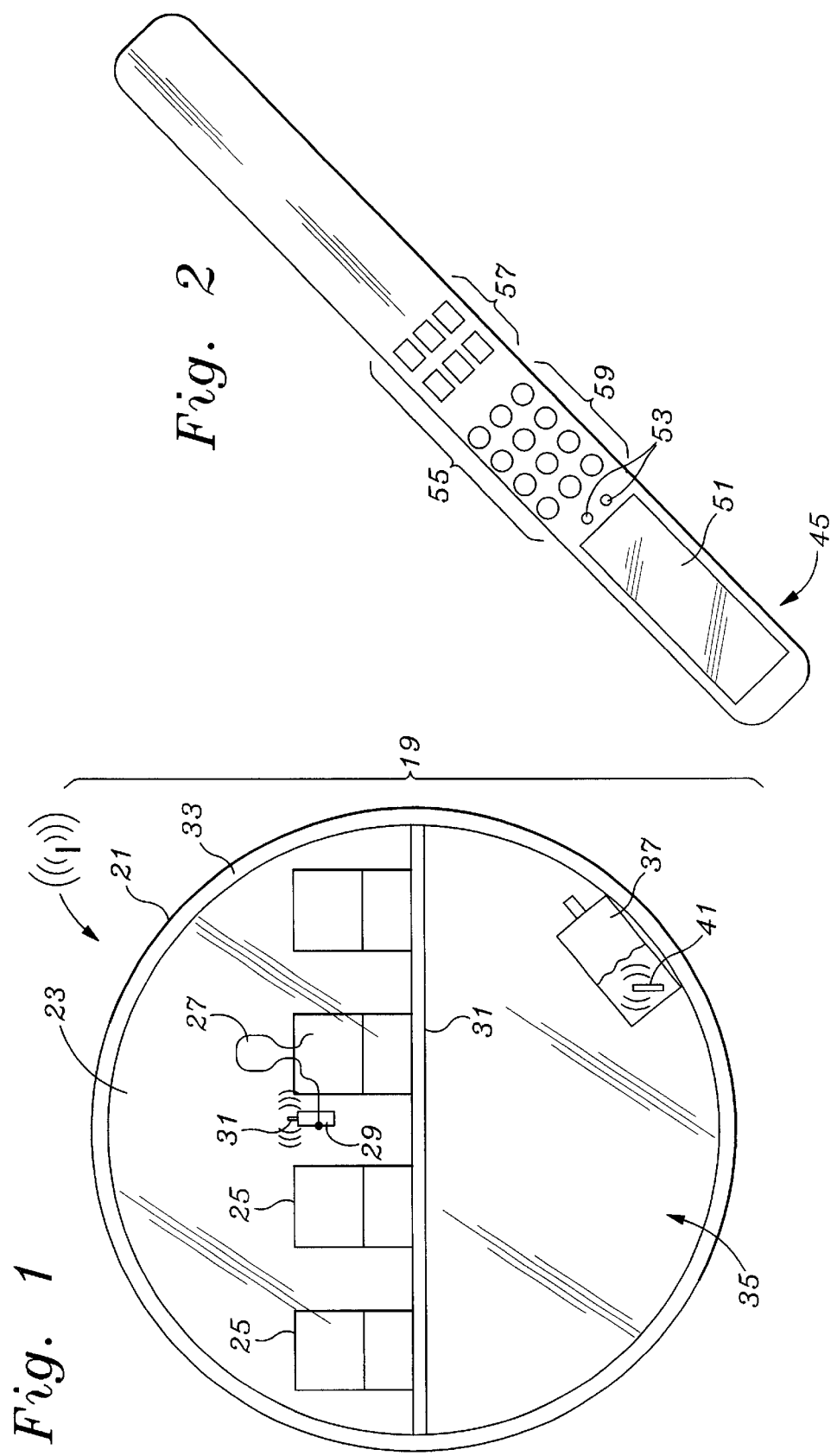

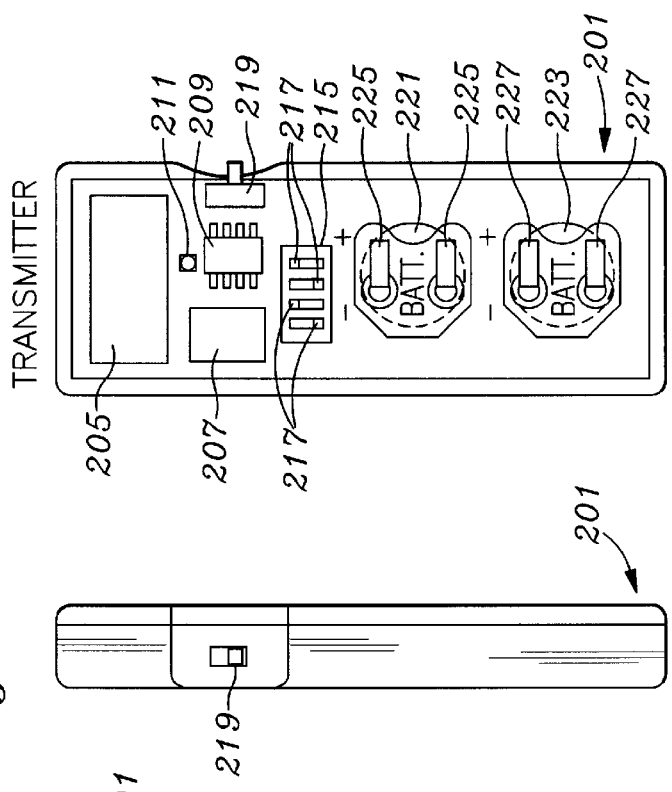
Fig. 9
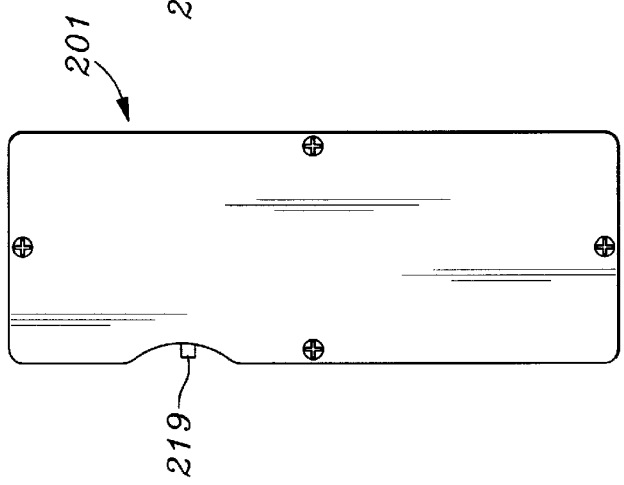
Fig. 11
Fig. 10
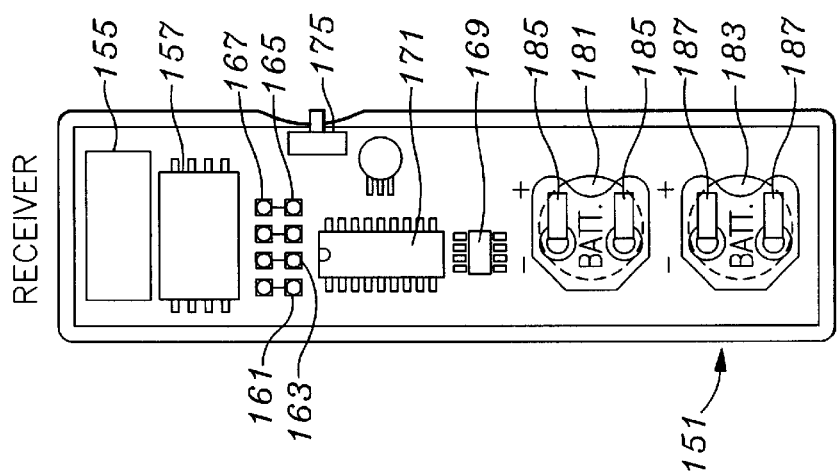
Fig. 8

PROXIMITY AND SENSING SYSTEM FOR BAGGAGE

This is a continuation-in-part U.S. Patent Application based upon U.S. patent application Ser. No. 09/512,965 filed on Feb. 25, 2000, now U.S. Pat. No. 6,265,975, and also upon co-pending U.S. patent application Ser. No. 09/627,366 filed on Jul. 28, 2000.

FIELD OF THE INVENTION

The present invention relates to a system especially for airline travelers whose travel articles, such as baggage and the like, may be separated from the traveler and hidden from view and which identifies the presence of the travel articles confirming for the passenger that the articles have not been left behind or routed on another aircraft, or in the alternative letting the traveler know that his bags are in fact left behind or routed onto another aircraft to give the traveler the ability to plan ahead and compensate by making alternative plans such as the taking of early action to insure that they are quickly located and to lessen the time during which the articles are unavailable, and may specifically relate to a system especially related to airline travel, which utilizes an altimeter, programmed methodology, and specific aircraft environment which may be known as a pressurization fingerprint, or cabin altitude fingerprint, to control power, including both inputs and outputs for portable electronic devices, hereinafter PEDs, such as cell phones, electronic luggage tags, luggage proximity systems, pagers, messaging devices, transmitters and transceivers.

BACKGROUND OF THE INVENTION

One of the biggest problems frequent air travelers have, and it is reflected in numerous surveys, is the fears and concerns which airline travelers today have about their bags and packages, which are turned over to the airlines to be carried as checked baggage, is a delay or mis routing of baggage especially such that the baggage is not traveling with the traveler. In addition, today's air carriers use a hub system that many times forces a traveler and his articles to change airplanes before reaching their final destinations. Many times a passenger's articles will begin a trip together only to be separated at a transfer point, especially the airlines's hub, during the journey.

The fact that a traveler knows that there is a chance of separation from baggage and checked articles causes concern, worry, and a feeling of helplessness. If the traveler were to positively have an indication that the bags were on the flight with him, the traveler would be able to relax, have a more enjoyable flight and concentrate all of his attention on working, reading, conversing or other activities during the flight. If the traveler were to positively have an indication that the bags were not on the flight with him, the traveler would be able to take steps to remedy the problem. For example if the traveler had knowledge that his bags were in fact separated from the traveler, he would be able to plan ahead by coordinating with the airline and others about replacing necessary articles, clothing, and the like at his destination to make up for any delay or ultimate loss of the articles and baggage. In addition, if the traveler knew at what physical location the separation of his articles and luggage occurred, especially in a journey requiring multiple changes in aircraft, he would be able to pass this superior knowledge on to the air lines to assist them in locating the luggage and articles which were separated. This information would be of value not only to the traveler, but to the airlines as well in achieving an efficient recovery of the bag.

An ancillary problem is the wait and uncertainty faced by a traveler in having to debark, walk to the baggage claim and locate his luggage and articles. In some cases the luggage and articles may already have been available for others to mistakenly take as their own. In other instances, the traveler has to wait and compete for his luggage and articles around a crowded carousel. Even when the traveler arrives at the carousel before his luggage and articles arrive, he may not see his checked belongings when they first emerge or they may be mistakenly removed by someone else.

Further, a traveler who is forced to wait at a carousel to defend possession of his luggage and articles will likely have to wait a second time in order to arrange ground transportation. Because people are so protective of their luggage and articles, they will rarely leave the carousel to chance while taking the opportunity for a rental car or shuttle transaction during the time before the luggage and articles arrive.

The separation of an airline traveler from his lug Any time that a traveler changes planes, and particularly when the passenger's arrival time is close to the next departure time, especially at a hub connection, there is a significant probability that the baggage will not make the flight on which the passenger has boarded. Also, depending upon the layout of the airport, and especially at a large hub where the physical distance between the arrival gate and the departure gate is large, a passenger making a tight connection may miss the next flight even though his baggage made it onto the plane.

Another danger which increases the worry of airline travelers is the possibility that the identity ticket on the checked baggage may become torn off inadvertently through ordinary handling. In this event, the luggage is certain to miss transfer at a hub, and even if it makes it way to a destination, the traveler may have trouble identifying it as his own, may increase the chances of being inadvertently claimed by someone else, and may also have trouble convincing gate security that the luggage and articles with the missing tag is his.

The baggage systems and airport security from air line to air line varies greatly. Some air lines use a computer to keep up with the baggage. Other air lines simply react only after a passenger is unable to locate their baggage. Where the baggage follows the passenger, the passenger can simply wait at the airport and only hope that it arrives. Where the baggage travels ahead of the passenger, there is some increased chance that it may be lost or stolen. If the passenger could call ahead, either from an aircraft phone or a personal phone, arrangements could be made to have the baggage collected as soon as it is available and held for later pickup after a positive identification of the owner.

The most overriding reason that it is valuable for the traveler to know if his baggage is accompanying the traveler is that many airports have such lax security that if the traveler is not on hand to collect the baggage when it is first made available to the passengers, there is a likelihood that it will be stolen.

Further, with the problems associated with the air line liability for lost baggage and the like, any system, no matter how rudimentary, which gives the air lines the ability to cut losses, would be welcome.

Another problem with baggage which does not travel in unison with the traveler is that of location and transfer. Baggage which travels on another flight is generally never separated from the baggage made available to the travelers of the arriving flight. As such, it becomes apparent that the baggage will maintain its unclaimed status only after a long time has passed since it was made available. This time period can be as long as an hour and a half, and where only one or a few baggage output areas are available, and during busy times, the baggage may not be identified as unclaimed for hours. As a result of any of these delays, and when the traveler makes inquiry at the destination location, the baggage, not being immediately held by the baggage claim department, is technically lost, and personnel have to be dispatched to look for it.

Other problems may compound the initial problem of baggage not traveling in unison with the traveler, including torn, damaged or removed destination tags, additional opportunity for pilferage by air line employees, and the like. Again, since most of the problems associated with lost baggage begins with a separation of the baggage from in-unison travel of the passenger, the most rudimentary help would include an early notification of the air line so that the baggage could be identified, located and segregated in order that more complete control over the baggage can be established. Secondarily, in transmitting the information to the air line baggage department, it would be important to know how many items of baggage were missing and if possible which items of baggage were missing, including a description of the physical shape and color of the baggage item.

What would be of even further help would be a device or method to aid in physical location of an item of lost baggage. As a beginning step, a system which would assist the owner of the baggage in personally locating it, perhaps in assistance with air line personnel would prove helpful. A system which is standardized and in which the air lines also shared in data base identification would even more greatly help as it would provide complete coordination between the traveler and the air line and reduce the instances of lost baggage to a minimum.

A significant problem identified for aircraft and aircraft controls is the interference caused by PEDs such as the aforementioned luggage location system, cell phones and computers. Excessive interference can interfere with or in extreme cases cause malfunction of aircraft systems. In general, all PEDs vary to such a great degree that poorly designed PEDs can emit excessive electromagnetic energy outside the frequency range and normal emissions power. The less expensive devices tend to be more widely available and used and these devices typically have much looser emissions specifications.

In addition, even where the PEDs operate normally and within specified limits the danger of interference on an aircraft is still present and especially at a time when the PED is not normally in use. New battery packs and more efficient operational electronics have provided users with longer battery life between charges/changes such that PEDs are typically left on to continue operating even when they are either inaccessible or operation inhibited. Cell phones are but one example. The typical use before re-charge, even when cell phones are left on, is on the order of several days. Due to this, users have developed the habit of leaving them on, even in circumstances where use will not occur. The most prevalent modes with regard to aircraft are with respect to PEDs which are in checked luggage, or are on the person or in personal carry on brief cases and bags. When traveling, the cell phone is a roam mode and uses more power than when the cell phone is neglected while within the home territory.

Another problem is power management. This problem exists in all electronic equipment, regardless of whether it emits potentially interfering electromagnetic signals. Although battery management has improved, any system which shuts off PEDs which have inadvertently been left on is highly desirable. In the area of aircraft flight, where the average duration of a trip is hours, any such saving would be extremely beneficial.

Generally, all devices carried by travelers should be shut off while on the aircraft. This includes cell phones, radios, CD players and tape recorders. Even where it is unintended, as in equipment having no immediately cognizable electromagnetic signal, unintended signals used on PEDs equipment can easily pass beyond the equipment housing and into the surrounding environment. These signals can combine to add to, subtract from and further modulate other signals. When this happens with one passenger's equipment, the outcome is unpredictable enough, but an aircraft filled with miscellaneous equipment can produce a cacophony of signals which can provide a real danger to the aircraft if the mix of output matches one of the systems utilized by the aircraft enough to interfere with it.

An even more useful is a power management system which may be used independently of or integrally with the needed PED. The independent operation is particularly useful where the logic operation of the main device would itself produce a significant power drain or spurious signal output. The needed system should enable equipment to shut off to extent possible when the equipment is on an aircraft. Even where equipment does not normally operate to deliberately output electromagnetic signals, a power management system can be used to insure that equipment inadvertently left on will shut off, but only when it proper. Where equipment does normally operate to deliberately output electromagnetic signals, a power management system can be used to independently insure that equipment inadvertently left on will either shut off, stop or reduce emissions, or reduce the level of operation. Where a standby mode is provided, the equipment may be instructed by an independent circuit to go into standby mode. The needed equipment should be programmable to sense the aircraft environment through a variety of sensing attributes including pressure, electromagnetic signature, signals particular to an airport, sounds such as are found on an aircraft, as well as command and control signals which may be applied within or appurtenant to the aircraft environment. The problems associated with PEDs may also be acute in the field of luggage location systems given the duration of flight.

SUMMARY OF THE INVENTION

A communication system is provided which can be realized in a number of ways to facilitate baggage tracking and recovery, and in which the problems associated with PED operation are solved.

In the most rudimentary realization, the traveler receives a signal from transmitters placed in the baggage which can identify the presence of each item of baggage by a code number which may show either as the code number or as a user supplied personal designator for a particular item of luggage. The transmitter is inexpensive and low power but works well in the aircraft environment and causes no interference with aircraft control, communication or navigation equipment. A first aspect of a preferred embodiment of the transmitter is programmable with an identification code of sufficient length to avoid interference with other codes. A second aspect is programmability as to transmitter mode. Depending upon the length of the trip being undertaken, pre-programmability can enable the user to instruct the transmitter to transmit during time windows when the user wants to know about the physical accompaniment of the baggage, such as times surrounding departure of the initial flight and the times surrounding the departure of the connecting flight. In addition, a rescue mode is programmable into the transmitter for a beacon signal at high power at given times and optionally a locator beacon at other times. Programmability of the transmitter is highly adaptable to (1) a custom receiver provided, (2) a custom control transceiver provided, or (3) the use of other receivers and transceivers through cloning or duplication of the send and receive identification information.

The frequency mode of operation can be radio frequency electromagnetic waves modulated with identity and information as amplitude modulation, frequency modulation, pulse width modulation, spread spectrum, the family radio frequencies at the 400–500 megahertz range, the cell and pager frequencies at 900 megahertz and higher frequencies. The system may also use sonic transmission and reception in addition to the radio frequency operating modes. Preferably, the frequency mode of operation can be programmable to include any number of frequencies at least sequentially.

As a result of the above, the invention can be provided to the user as a simple transmitter for use in conjunction with a user's pre-existing pager or pre-existing cell phone or receiver. At the next level, the system of the present invention can be provided as a transmitter and receiver system where the user can program the transmitters included with the baggage and then utilize the receiver to get a more exact readout of the status of the baggage. In addition, the receiver can carry a signal strength indicator which is useful in indicating the proximity of the baggage. At the next level, the transmitter which is placed with the baggage is replaced with a transponder and the custom receiver of the user becomes a transceiver. In this embodiment level, maximum efficiency is obtained. The startup protocol can include: (1) a timer in the transponder to turn on and off during a narrow window during which the traveler's transceiver can bring the transponder to fall power and interrogate multiple transponders as to their identity and presence.

The advantages of the ability of the traveler to use the system of the invention are several. Where one piece of baggage is missing, the user can then contact the air lines and notify them, in some cases in time to correct a small routing problem and include the baggage on the flight. In other cases, the airline may be able to find the luggage early enough to then specially route the luggage on another flight or even another carrier such that it catches up with the traveler at the next stop.

Another advantage is at the arrival terminal. The traveler will be notified by the system when his luggage and articles enter the room. Thus, while others stand around the carousel, the traveler using the system of the invention can transact business at the rental car or ground transportation area, which is typically in the same room or closely adjacent to the baggage carousel. As the luggage or articles enter the room, the traveler's receiver will indicate the arrival. This can be accompanied by a beep, a light illumination, as well in a manner which will indicate which bags have arrived. Even if the traveler is in the midst of transacting business, it will be an easy matter to simply step over to the carousel, retrieve the article and then return to a counter where business was being transacted.

Using this system, the traveler saves not only piece of mind but a tremendous time saving as well. Further, in any situation outside of the aircraft, rather than fight the crowds around the carousel, the traveler can observe his baggage arrive into the room, on his hand held monitor, piece by piece.

Further, in the event that the traveler's baggage is lost, he can accompany a baggage employee with the hand held monitor to indicate the articles's presence. The traveler can further send a signal to the bags to emit any of a number of sounds from a short beep to a siren blast to facilitate finding the baggage.

As will be shown in the Figures and description, the system of the present invention is realizable in a wide variety of levels of complexity and communicative overlay. In general, a larger and more sophisticated version of the invention will be initially shown, followed by a more compact and simple version.

In one embodiment of the communications topology, the transmitter associated with the luggage would emit a series of two or three short pulses of from approximately about less than a second each to about a second each and sent about every ten seconds within a first period as a sending interval, and then followed by a second period as a rest period of about one minute of rest. For example, where two pulses are sent within twenty seconds, followed by a one minute rest period, a one minute and twenty second minimum length action cycle is created. Thus, an indicator unit would have a listening period longer than the minimum length action cycle and may have multiples of such cycle. Further, since the system of the invention utilizes multiple transmitters, and although the probability is small, to prevent doubling transmission signals from consistently interfering with each other, at least one of the length of the rest cycle and the minimum ten second transmission spacing is randomized so that the rest cycle can be greater or less than about a minute, and so that the transmission spacing can range from the minimum ten seconds to about 30 seconds. It is preferable that if one of the transmission spacing and rest period is randomized that the other be complementarily shortened to give a maximum operational window which does not exceed the maximum time which the indicator unit of the invention is switched on and is actively looking for the signal. Even with such complementary randomization, a very low magnitude duty cycle is created and allows for an extended battery life. In a larger version this extends battery life such that the batteries are more likely to fail from age and environmental effects than depletion of current. In a smaller, more compact version, even coin sized batteries supplying power supporting only a transmit function would enable a battery life of two years or more.

The more sophisticated system would include a transceiver which could communicate and command the transmitter and contemplates a transmitter with other capabilities including frequency band switching, frequency mode of transmission, audible signaling and more. The simplest system would include a small, preferably only simply programmable or of dedicated pre-specified function and which could be clipped onto the belt, or carried in the pocket or purse. The smaller version would preferably have a diode or crystal display that would indicate that it has received an identity signal from the luggage or other articles to show the traveler that such luggage or other articles have been loaded aboard the aircraft while the traveler is also on board. Even on the small, lightweight version of the receiver, an indicator will preferably be able to receive signals from four to six transmitters located in from four to six separate units of luggage. Each of the different transmitters, one for each unit of luggage, would preferably carry its own code which would be modulated onto its transmitter signal.

Regardless of complexity, the receiver of the invention would have the capability for both a shutdown after several minutes of operation, as well as a shutdown after receiving a signal from the numbers of different units of luggage on the trip. For example, if there are three codes to be detected, and all three are in fact detected, the unit could shut itself down to conserve power. On subsequent power-up, and before the circuit is cleared for another probing of the transmitter's presence within the aircraft, the receiver unit can simply indicate the presence of the transmitters. This will conserve power by not having to keep the receiver on for long periods of time, and the power necessary to store a simple indication of having received the signal is de minimis. Low power is an advantage both to the traveler and within the aircraft environment. For example, smoke detectors have currently been approved for aircraft use in a wireless system where the power is of insufficient magnitude to interfere with aircraft electronics, yet secure in communications to perform its important function. The utilization of low power within an aircraft is especially facilitated by modem aircraft internal barriers, floors, and surroundings, which are made of composite material. The random communicative aspect derives from a sparse number and location of portals through which the signal could have passed if such were available, as well as a concomitant high dependence upon orientation toward such portals, on behalf of both the transmitter and the receiver. Further, high power transmitters would be just as likely to give a "presence" reading from 100 yards away on the tarmac as they would inside the aircraft. Currently used composite and fiberglass supports within the fuselage are transmissive of electromagnetic radiation and contribute to the ability to effectively utilize low power on the system of the invention. Other issues include the use of a power and frequency which will not interfere with the aircraft electronics. Smoke detectors now in utilization on aircraft have a power output and frequency and operating mode in conformity with those described for the present invention and have shown to be compatible with the electronic environment of the basic aircraft electronics. The preferred embodiment may have ordinary single direction polarization or circular polarization, particularly if there is enough room for a phased array.

However, with regard to eliminating even further problems which are generally associated with PEDs, a power management system is provided which can be realized in a number of ways to facilitate reduction of harmful emissions and to provide power conservation, and which can be used with the luggage location system of the invention to eliminate any PED based objections to its use onboard an aircraft. The principles will be discussed in relation to PEDs generally with the implicit understanding that the luggage location system of the invention is but one such PED.

The problem of power management is addressed by one of the many systems programmable to sense the aircraft environment through a variety of sensing attributes including pressure, electromagnetic signature, signals particular to an airport, sounds such as are found on an aircraft, as well as command and control signals which may be applied within or appurtenant to the aircraft environment. In the system exemplified, a pressure transducer is used to sense an aircraft's pressure/altitude profile and is utilized to optionally manage internal or external controls for both shut down, turn on, and reduced operation, especially electromagnetic reception and transmission control in the case of a PED which transmits or receives. This system can be applied to any device, including cell phones, radios, CD players and tape recorders. The system overcomes the fact that most travelers tend to be inattentive to personal electronic equipment leaving such equipment on, especially since the equipment battery usage has become so efficient that users have accustomed themselves to long usage periods. Advantage is taken of the fact that commercial aircraft, whether pressurized or un-pressurized, tends to produce a predictable profile, and this profile is made compatible with the power consumption and transmitter behavior of the communications system. Should standards be developed to apply to all personal electronic equipment which are likely to be brought aboard aircraft, air safety would be vastly improved. Further, the control can be overridden where the user has manual access to the PEDs where immediate cognitive usage is desired. This may be especially useful for PEDs located in, "carry on" luggage which is involuntarily and in a rushed manner converted to "checked baggage" at the last minute especially due to size and weight restrictions.

The techniques of the invention also prevent unwarranted shut off of PEDs such as when a user boards an elevator to a tall building, or where the user drives an automobile up a mountain. These types of conditions are a signal that an aircraft environment may be about to be present, but are not fully proven as present.

BRIEF DESCRIPTION OF THE DRAWINGS

The invention, its configuration, construction, and operation will be best further described in the following detailed description, taken in conjunction with the accompanying drawings in which:

FIG. 1 is a cross sectional view of an aircraft illustrating the passenger compartment in which a traveler operates an indicator unit and a baggage compartment having baggage unit containing a baggage location unit;

FIG. 2 is a perspective view of one possible embodiment of a full capability programmable transponding baggage location unit;

FIG. 8 is a plan view of the internals of a minimalist version of the indicator unit for indicating the proximity of a minimalist baggage location unit within an aircraft;

FIG. 9 is a plan view of the internals of a minimalist version of a baggage location unit which is specifically designed for operation and use with the minimalist baggage location unit of FIG. 8, within an aircraft;

FIG. 10 is a rear view of the baggage location unit of FIG. 9;

FIG. 11 is a side view of the baggage location unit of FIGS. 9 and 10.

DETAILED DESCRIPTION OF THE PREFERRED EMBODIMENT

Figure 3:
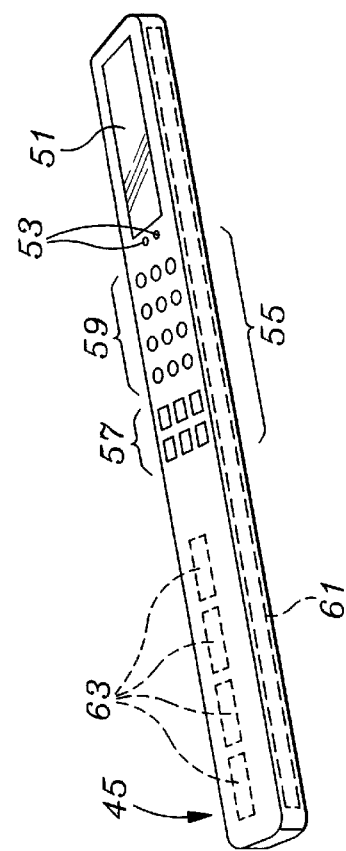
FIG. 3 is a reverse view of a full function baggage location unit seen in FIG. 2 and illustrating a possible configuration of antenna and battery supply in phantom.

Referring to FIG. 1, a luggage tracking system 19 is best described beginning with a sectional view of an aircraft 21 indicates a passenger cabin area 23 having typical seating 25 and a seated passenger 27. The passenger 27 holds an indicator unit 29 which may have an internal or an external antenna 31 for facilitating reception or transmission and reception of an electromagnetic signal.

The seating 25 is supported by a flooring structure 31 which is attached to an air frame 33. The flooring structure 31 in older model aircraft is typically metal with multiple openings and conduit passageways which enable radio frequency signals to pass through, especially adjacent points of attachment to the air frame 33. Below the flooring structure 31, and at certain lengths along the aircraft fuselage, is a baggage hold space 35. Within the baggage hold space 35 may be located one or more units of baggage or baggage 37. Inside the baggage 37 is a baggage location unit 41. As will be seen, the baggage location unit 41 can be available in a variety of embodiments as can the indicator unit 29.

Referring to FIG. 2, a plan view of one embodiment of a location unit 41 is seen as a location unit 45. It is clear that the location unit 41 can be in any physical configuration, but to help match the antenna length advantages, and for concealment an elongate form has advantages. Shown on the location unit 45 is a liquid crystal display 51 which can be made to show programming status, output mode, output power, battery level and transmitter mode and power output history. Other attributes which are of interest in relation to the environment of the baggage can be included, such as atmospheric pressure, temperature, humidity, global positioning data and the like. These aspects enable the traveler, on recovery, to examine the location and conditions of the physical location and environment in which the baggage has been kept.

The location unit 45 can include one or more light emitting diodes 53 which can be useful for indicating power levels, charge and programming assistance, as well as an input keypad 55 including a series of command keys 57 and an alpha numeric keypad 59 assist in programming.

Referring to FIG. 3, a reverse look at the location unit 45 enables the showing of additional details in phantom without obscuring the input and output programmability features seen in FIG. 2. An antenna 61 is shown in dashed line format as occupying virtually the length of the location unit 45. The ability to include an internal antenna having a length approaching no more than half of the natural wavelength of the frequency selected is of benefit not only in power efficiency but in the physical ability to have the signal transmitted. In the Family frequency at the 400–500 megahertz range, the natural wavelength is about $\frac{2}{3}$ of a meter. This size may be a bit long for a full wave antenna and thus for this frequency, a half wave dipole could be used as the antenna 61. At the 900 megahertz band, the natural antenna length is about $\frac{1}{3}$ meter. In the highest capability, the transmitter may have the ability to transmit on several frequencies. Transmitter chips are being standardized for multi-band operation in the amateur and commercial services. For 1.5 gigahertz, for example, the antenna length is about 0.2 meters and for 2.5 gigahertz about 0.12 meters. As such, the antenna 61 may be trapped for half wave operation at the 400–500 megahertz band and tuned for fall wave operation on frequencies at and above 900 megahertz. Such multi-band antennas are commonly commercially available, or easily producible. An overall length of about one foot or less for the location unit 45 is a convenient size. Also shown in phantom is a series of batteries 63 placed end to end. A "AAA" battery size enables a thickness of the location unit 45 of about $\frac{7}{16}$ of an inch to about a half of an inch. This thickness lends to the location unit 45 the ability to be easily concealed in any type of baggage or baggage 37. However, it is preferable that the baggage 37 not provide a sealed completely surrounding conductor, such as a completely metal suitcase. If such a suitcase or brief case is provided, it can be retrofitted with an inside pickup antenna connected to an outside antenna, such as a passive port antenna used in buildings to enable weak cellular phone communication signals to communicate outside of the building. Such a port antenna would typically include an internal antenna not grounded to the metal body, and electrically connected to an external strip of material serving as an external antenna through the metal body in a manner insulated from grounding with the metal body. However, most baggage, packages and baggage are made from non-conductive materials and the use of the location unit 45 without further concern for outputting of an electromagnetic signal is believed to be the norm for the vast majority of the time.

Figure 4:
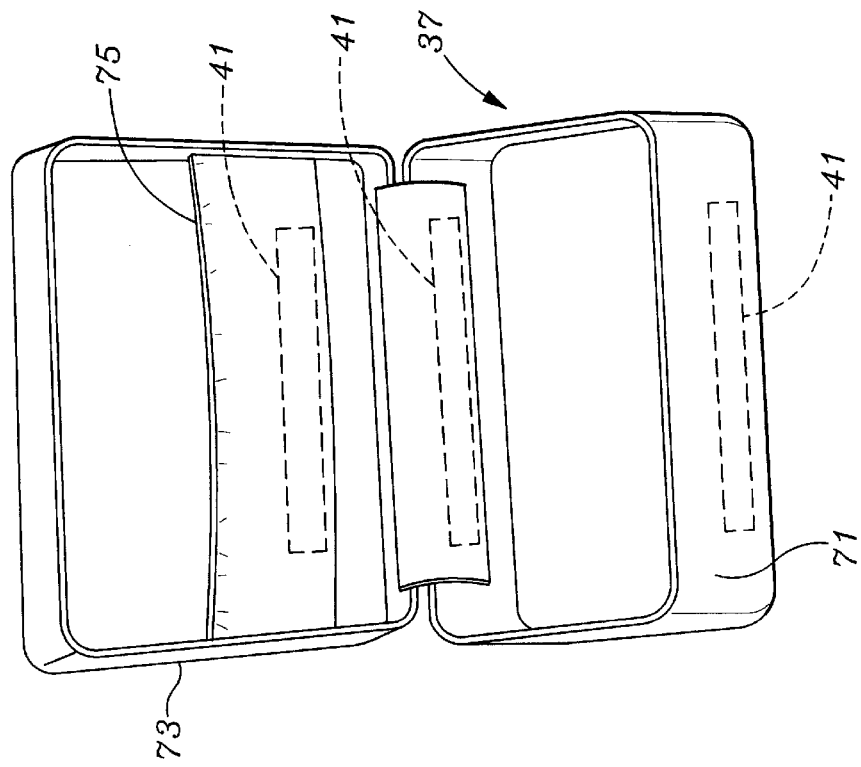
FIG. 4 is a schematic representation of a unit of baggage and illustrating the potential placement of the baggage location unit of FIGS. 2 and 3.

Referring to FIG. 4, a baggage unit 37 as an example is shown in open position. The baggage unit 37 has a base 71 and a lid 73 with a compartment 75. A hinge cover flap 77 is seen extending between the base 71 and the lid 73. As is shown in phantom, the compartment 75 can easily and concealably fit the location unit 45. The hinge cover flap 77 provides another venue for the location unit 45 as it can be secreted into a location where it will likely not be discovered. Another possibility is seen just inside the front of the base 71 where it can be placed inside of a cloth covering, a lining or other structure. The cover flap 77 location and the location inside the front of the base 71 also provides protective reinforcement for the location unit 45.

Figure 5:
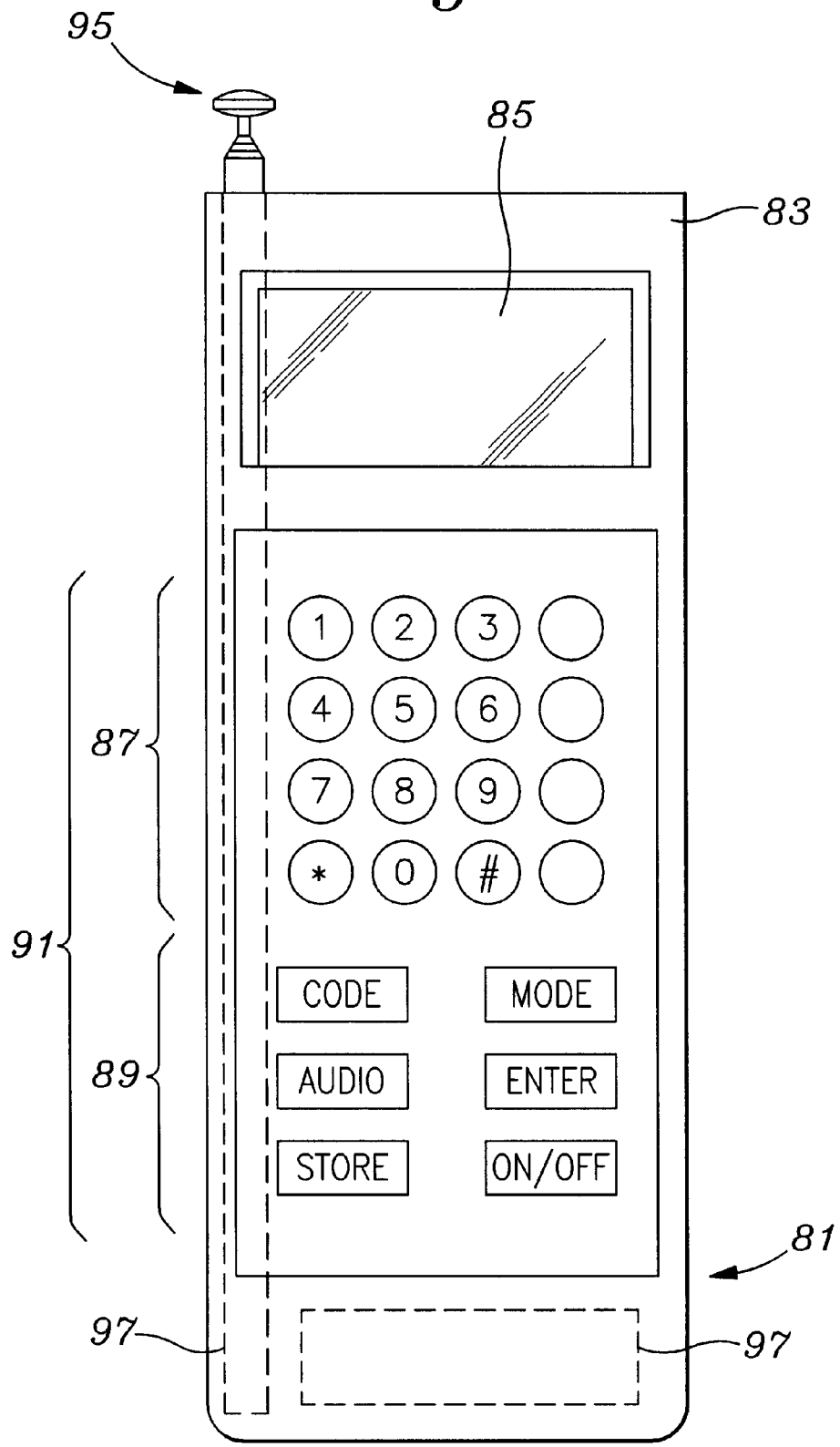
FIG. 5 is a view of a fully programmable indicator unit with liquid crystal display, programmability, scanning and transponsive activity capability.

Referring to FIG. 5, one embodiment of an indicator unit 29 is seen as an indicator unit 81. Indicator unit 81 is seen to possibly be of pocket size with a housing 83 and a baggage code/display indicator 85 as a liquid crystal display. A numeric key and auxiliary pad 87 includes numbers for input of codes, and supplementary keys for controlling the input. A series of command keys 89 are seen below the numeric key and auxiliary pad 87 and form an input keypad 91. An antenna 93 is shown to the left of the indicator unit 81 and is thus, when positioned internally, is oriented so that the longest portion fits within the housing of the indicator unit 81. Antenna 93 can have an external extendable portion 95 wherein the user is enabled to extend the antenna 93 in order to maximize the sensitivity of the indicator unit 81 in order to either further make certain that the luggage or baggage containing the luggage location unit 41 is not present, or to simply increase the reliability of communications between the transmitter and receiver. Also shown in dashed line format is a battery 97 which may number several and are provided with due consideration to the weight and long operation of the indicator unit 81.

Figure 6:
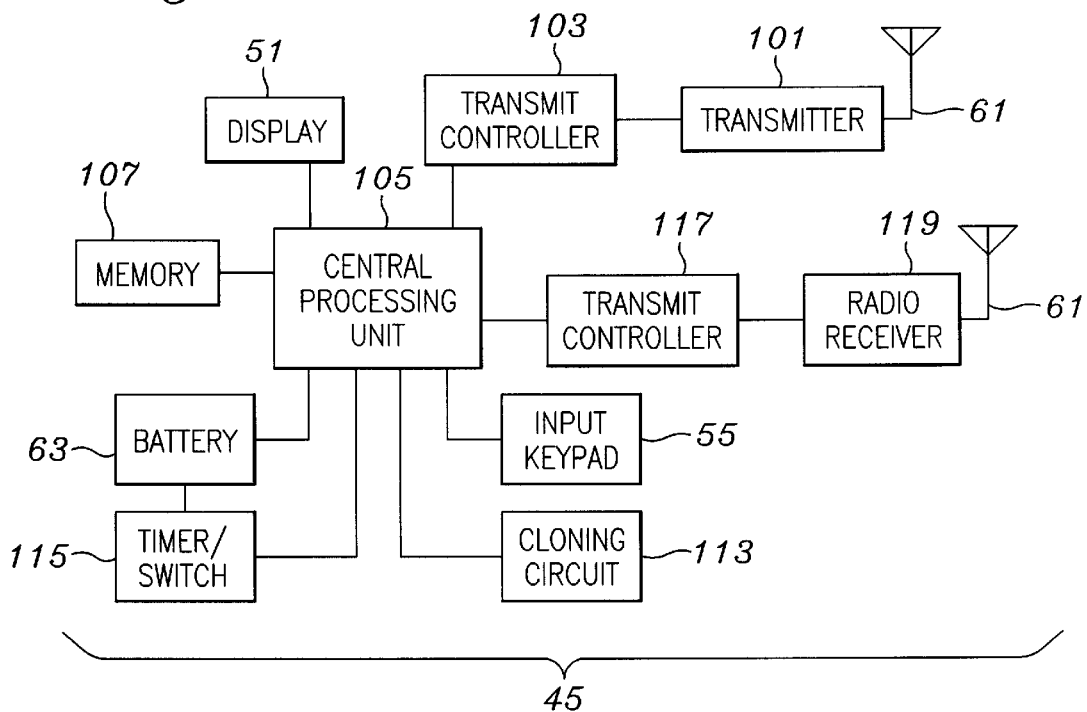
FIG. 6 is a block diagram of the fall capability programmable transponding baggage location unit seen in FIGS. 2 and 3.

Referring to FIG. 6, one possible realization for the location unit 41 is shown in block diagram format. A TRANSMITTER 101 is shown as being connected to the antenna 61 and to a TRANSMIT CONTROLLER 103. The TRANSMIT CONTROLLER 103 can be of a type which can modulate the TRANSMITTER 101 in order to control output frequency, transmit mode, and also to select the method upon which information is transmitted or modulated with respect to each mode. The TRANSMIT CONTROLLER 103 is connected to a CENTRAL PROCESSING UNIT 105 which in high end units may be completely programmable. CENTRAL PROCESSING UNIT 105 is connected to the input keypad 55 seen in FIGS. 2 & 3 and to the battery 63 seen in FIG. 3. CENTRAL PROCESSING UNIT 105 may have a connected MEMORY 107, and is also connected to the display 51. A CLONING CIRCUIT 113 may also be provided for automatic interrogative programming with respect to analog and digital cellular phones, and pre-existing pagers. In the case of a pager, a user provided numeric code can cause the cloning circuit to monitor pager frequencies and perhaps automatically subsume and record the pager identity which corresponds with the user's pager. Thereafter, the combination of CENTRAL PROCESSING UNIT 105, TRANSMIT CONTROLLER 103 and TRANSMITTER 101 can direct a signal directly into a user's pager to identify proximity of the luggage 37 while inside the aircraft fuselage.

For really flexible operation, a TIMER/SWITCH block 115 is connected to both the battery 63 as well as the CENTRAL PROCESSING UNIT 105. In this connective configuration the TIMER/SWITCH block 115 can provide a very low battery drain and can initiate and control a sleep mode of the CENTRAL PROCESSING UNIT 105 without having to use the timer normally present in the CENTRAL PROCESSING UNIT 105 in order to control the periodic on and off functions. For example, in order to conserve energy, the TIMER/SWITCH block 115 can be set through programming provided to the the CENTRAL PROCESSING UNIT 105 to turn on and initialize the the CENTRAL PROCESSING UNIT 105 only during thirty seconds each hour. Alternative programming may provide for the CENTRAL PROCESSING UNIT 105 operation for one minute every fifteen minutes during the expected initial departure time, followed by a shut down for hours until either the destination time arrives or until time to change planes arrives at which time the traveler will want to know if his checked baggage is still traveling on the flight with him.

A RECEIVER CONTROLLER 117 may also be connected to the CENTRAL PROCESSING UNIT 105 to receive commands from a RADIO RECEIVER 119, which is also preferably connected to the antenna 61. The RADIO RECEIVER may be a pager receiver, or a receiver for receiving signals on several frequencies from the indicator unit 29.

Figure 7:
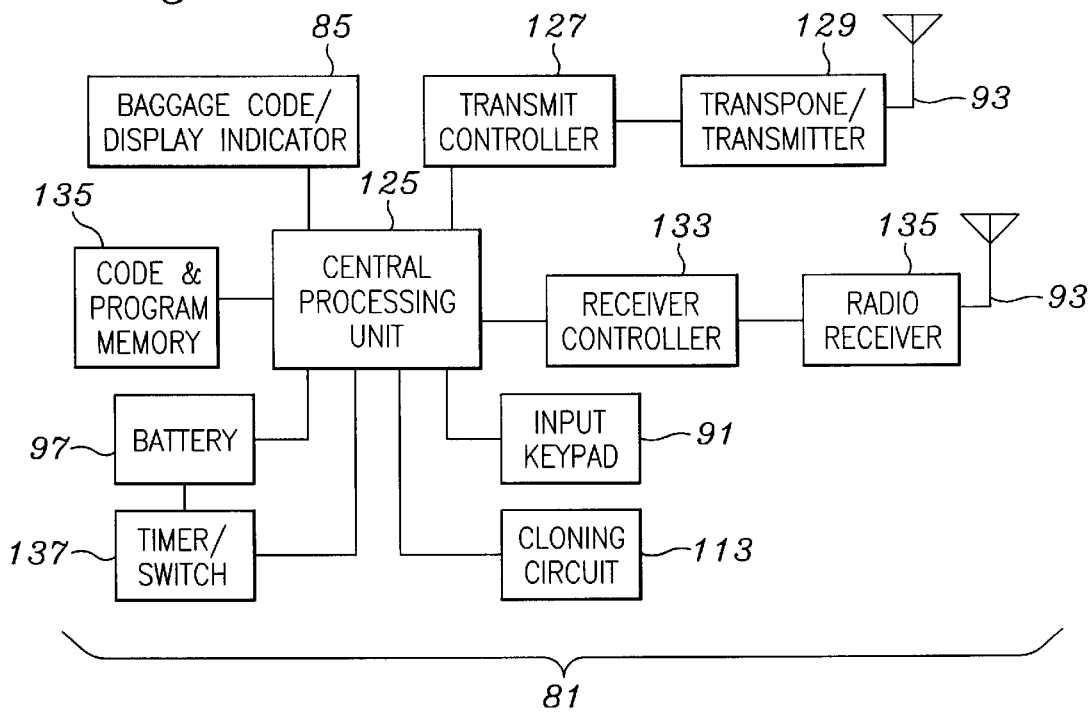
FIG. 7 is a block diagram of the fall capability programmable transponding display unit seen in FIG. 5.

Referring to FIG. 7 a schematic block diagram illustrates one possible operational configuration for the indicator unit 81. The baggage code/display indictor 85 is seen as connected to a CENTRAL PROCESSING UNIT 125. Where the indicator unit 81 has transmitter capability, the CENTRAL PROCESSING UNIT 125 will be preferably connected to a TRANSMIT CONTROLLER 127 which is in turn connected to TRANSMITTER 129. The TRANSMITTER 129 is connected to the antenna 93 seen in FIG. 5.

CENTRAL PROCESSING UNIT 125 is also connected to a RECEIVER CONTROLLER 133. The RECEIVER CONTROLLER 133 is connected to a RADIO RECEIVER 135. RADIO RECEIVER 135 is again connected to the antenna 93 seen in FIG. 5. CENTRAL PROCESSING UNIT 125 is also configured for scanning and transponder operation. The luggage location unit 45 may be programmed to either (1) sequentially transmit over more than one frequency or (2) more than one mode on such frequency, the CENTRAL PROCESSING UNIT 125 may be programmed to scan all such frequencies sequentially in order to pick up an indication of the proximity of the luggage location unit 45. With programming in transponder capability, the indicator unit 81 can put out a signal to instruct the luggage location unit 45 to echo a signal on all of the frequencies within their communication capability so that communication could be had on the clearest of those frequencies. In a pure scanner function, the luggage location unit 45 simply transmits at given points in time at a signal duration longer than the channel changing and listening duration of the scanning indicator unit 81. In this mode of operation, the luggage location unit 45 transmits at given times through each of its frequencies and modulation modes simply as a matter of course. In this configuration, it is simply up to indicator unit 81 to pickup a code identifying the luggage location unit 45, and associated with the baggage unit 37 in which it is located. As a result of this mode of operation, and where three such baggage units 37 each containing a luggage location unit 45 are located within the air frame 33, one might be located so that it best communicates with the indicator unit 81 on a first frequency at a first modulation type, where as the others may be more readily identified on other frequencies and at other modulations. The indicator unit 81 simply scans through all common frequencies and modulation modes during its receive cycle and until the coded signals from all three luggage location units 45 are received. CENTRAL PROCESSING UNIT 125 may be programmed to shut down once either all of the requisite signals are received, or upon the elapse of a given amount of time. After all, at take off, as the aircraft is backing out of the terminal, the baggage unit 37 containing the luggage location unit 45 has either made it to the baggage hold space 35 of the aircraft 21, or it has not. A scan limited to from between 3–5 minutes is likely to exhaustively determined the presence of the baggage unit 37 luggage location unit 45 if it is present on the aircraft 21.

Indicator unit 81 also includes a CODE & PROGRAM MEMORY 135 so that the codes of the luggage location unit 45 can be stored as well as enabled, as when a trip is taken where not all of the luggage location units 45 are taken along.

Battery 97, seen in FIG. 5, is also seen in FIG. 7 and connected to the CENTRAL PROCESSING UNIT 125. A TIMER/SWITCH 137 is connected preferably to both the CENTRAL PROCESSING UNIT 125 and the TIMER/SWITCH 137 so that the timer may operate independently and so that the CENTRAL PROCESSING UNIT 125 can be shut down for long periods of time and preferably automatically cause the CENTRAL PROCESSING UNIT 125 to power up at the next time when a luggage check is needed, if such function is programmed into the TIMER/SWITCH 137 through the CENTRAL PROCESSING UNIT 125. Also shown is a CLONING CIRCUIT 141 connected to the CENTRAL PROCESSING UNIT 125 where either another existing indicator unit 81, or another luggage location unit 45, or another component such as a cell phone can be cloned, or where another component such as a pager can be emulated. For cloning, another instrument, such as a cell phone can be linked with a luggage location unit 45, especially where the luggage location unit 45 doesn't have its own cloning unit. Where a family purchases a second indicator unit 81, the cloning feature of CLONING CIRCUIT 81 can be used to bring the new indicator unit 81 up to date on the programming, codes, frequencies, etc. of the first indicator unit 81. In the alternative, where a family purchases a second luggage location unit 45, and especially where the second luggage location unit 45 itself has no cloning feature, such as when the first indicator unit 81 is used to program the luggage location units 45. With these possibilities, it can be seen that a system can be used in which either the indicator unit 81 or the cloning feature of CLONING CIRCUIT 81 can be used to bring the new indicator unit 81 up to date on the programming, codes, frequencies, etc.

The fully user programmable luggage location unit 45 and indicator unit 81 sacrifice some size, weight, battery size and battery longevity advantages for fill programmability and virtually complete user flexibility in terms of satisfying a wide possibility of operating modes. In terms of a single function, preferably pre-programmed, and available with pre-programmed codes, many of these advantages can be regained.

Referring to FIG. 8, a plan view of a small version of an indicator unit 29 is seen as an indicator unit 151 having a housing 153, internal flat antenna 155 and main radio receiver chip 157. Internal flat antenna 155 would, because of its small size and flat profile, be especially amenable for configuring for alternative orientational modes, such as circular polarization, with or without the use of phase delay, as well as the use of different phased polarization. A series of pulses can be output such that each may be at a particular orientation with each subsequent transmission having a changed angle. The use of a first polarization with subsequent polarizations at forty five degrees difference would produce a pulse set having four different phase orientations, the fifth being omitted as simply a one hundred eighty degree or inversion of the first pulse in the set. Other variations are possible, including right and left hand polarization. However, since the antenna 155 is associated with the indicator unit 151, an automatic tuning or scanning function can be used, as well as a "spread spectrum" arrangement for receiving, such as a multi path logic array which enables the receiver or tuner to responds either instantaneously or by detection to the best configuration for maximizing the incoming signal.

A series of four surface mount light emitting diodes 161, 163, 165, and 167 each of which is set to light when a corresponding transmitter carrying a pre-coded identity signal is received. Although only four such emitting diodes 161, 163, 165, and 167 are seen, it is understood that any number may be used. Four such diodes 161, 163, 165, and 167 are seen as it is believed that a traveler would probably have four or less checked items. Other versions of indicator unit 29 may include more or less indicators corresponding to different numbers of transmitters.

A set of pre-wired chips 169 and 171 may be provided which operate the indicator unit 151 to accomplish tasks pertinent to indicating the presence of luggage location units 41 as well as the goals of achieving small size and simple operation, etc. The indicator unit 151 is ideally provided with its associated transmitting units such that the user need do nothing more than turn the units on and place them within the units of luggage 37. Tasks for the pre-wired chips 169 and 171 may include responding to a powering up signal provided by a push button switch 175, turning on the main radio receiver chip 157 for continuous listening coverage of a single pre-specified radio frequency and modulation mode. In order to conserve battery power, the indicator unit 151 should be pre-programmed to at least shut down after two to three minutes.

Since the luggage location units 41 are out of manual control range and since for a minimalist programmability the transpondive operation has been eliminated, the preferable communications protocol involves only periodic bursts of electromagnetic signal from a luggage location unit in the position of luggage location unit 41. This requires a continuous period of radio frequency monitoring for at least the period necessary to insure that a signal from a luggage location unit 41 has been sent.

As a result, an automatic cycle of the indicator unit 151 will preferably enable powering up, continuous reception for the time necessary to hear one or more signals if present, followed by a recordation of reception of a signal present on an associated one of the four such diodes 161, 163, 165, and 167. Thus, if all four luggage location units, such as luggage location unit 41 are present, all four diodes 161, 163, 165, and 167 will light within the luggage location unit 41 cycle period, the user will see the lights and know which luggage items 37 are present. The user then simply allows the indicator unit 151 to shut itself off once the requisite number of diodes 161, 163, 165, and 167 are seen. Where a traveler only takes two luggage location units 41, the traveler will look only for two of the diodes 161, 163, 165, and 167 to light to know that all of his luggage units 37 are on-board the aircraft.

Also shown in FIG. 8 are a pair of coin shaped batteries 181 and 183 and which are held within battery clips 185 and 187 respectively. Using the battery saving short cycle time for active reception, the indicator unit 151 is enabled to operate with such small coin shaped batteries 181 & 183. The entire indicator unit 151 can be about four inches long and about one and a half inches wide. Again, it should ideally become commercially available with as many luggage location units 41 as it is enabled to show receipt of associated coded signals to show presence within an aircraft.

Other programming features may include, in addition to the confirmation of the presence of the location unit 41 by diodes 161, 163, 165, and 167, a beep at the time each of the by diodes 161, 163, 165, and 167 is illuminated. Another feature is preferably a longer or different or two tone beep after a complete transmit cycle of the location unit 41 (a time by which the location unit 41 should have been heard, if at all) to get the attention of the traveler, to indicate to the traveler that the unit is about to shut off and to have the traveler take stock of which location units 41 have had signals associated with them received and which have not. This should typically occur about thirty seconds before shut down. Preferably, the indicator unit 151 may be set to receive very short 9600 baud serial format bursts. The location unit 41 should conversely transmit such very short 9600 baud serial format bursts within an active window of time, followed by a rest period. The active window may include a ten second window during which two or three of the transmission bursts occur, and then followed by a fifty second rest period. This creates a one minute cycle time. The one minute cycle time represents the minimum period during which the indicator unit 151 should be on, and preferably the indicator unit 151 will be programmed to stay on through at least two such one minute cycle times.

Referring to FIG. 9, a minimalist luggage location unit 41 is shown as a luggage location unit 201 in plan view. Luggage location unit 201 has a housing 203, internal flat antenna 205 and a main radio transmitter chip 207. Internal flat antenna 205 has the same potential and capability as was mentioned with respect to internal flat antenna 155, including circular polarization, with or without the use of phase delay, the use of different phased polarization, and sequential changed angle transmission. Where the luggage location unit 201 transmits automatically, it is possible to program the device to step through phasing of the internal flat antenna 155. Where transponding operation is had, where the luggage location unit 201 can respond to the 151 indicator unit 151, antenna phase is simply another aspect which can be probed for full transpondence, along with frequency and operating mode, etc.

A logic chip 209 is also present as well as an LED (light emitting diode) indicator 211 which may be used to show a power on as well as a low battery condition. In order to save power, it is preferable that the indicator 211 is lit only momentarily, such as on for a period of several seconds to indicate that the luggage location unit 201 is switched on. Where the indicator 211 indicates a low battery condition, it should flash intermittently, such as once every 10 seconds, so that if the low battery condition is reached while it is in service, the luggage location unit 201 may continue its transmit function for as long as possible under such low battery condition.

Adjacent the logic chip 209 is a dip switch set 215 having a set of four switches 217. Dip switch set 215 gives the additional flexibility of being able to use $2^N$ codes where N is the number of dip switches 17. Dip switch set 215 is shown with four switches 17 to give a total possibility of 16 codes. This is optional, and as has been previously stated, the luggage location unit 201 can be provided commercially along with the indicator unit 151 where both have codes hard wired. In hard wired fashion, the numbers of codes available on manufacturing may be of a higher number. In the configurations of the luggage location unit 201 and indicator unit 151, the indicator unit 151 may be available with a hard wired code and sold with at least one luggage location unit 201 for which the user sets the dip switches 17 of the dip switch set 215. With the dip switch set 215 provided, additional units can be purchased and added to the operating set from which the indicator unit 151 will track and record signals.

Further, since each indicator unit 151 shown in the Figures, for example, is to receive signals from up to four luggage location units 201, the dip switch set 215 can have the first two switches 17 related to a setting matching the identity of the indicator unit 151, while the last two switches 17 can indicate which of the four indicator light emitting diodes 161, 163, 165, and 167 which the user wants to associate with the luggage location unit 201. It will be preferable to add dip switch set 215 having more such dip switches 17 and positions to indicate more complex numeric codes.

Also seen is a slide switch 219 which is used to turn the luggage location unit 201 on and leave it on. Luggage location unit 201 may also have a program which causes power shut down after a period of time, say either 12, 24, or 48 hours, in order to conserve battery power. Such an option may be selectable by the traveler, in an attempt to avoid battery depletion by simply forgetting to turn the luggage location unit off.

Also shown in FIG. 9 are a pair of coin shaped batteries 221 and 223 and which are held within battery clips 225 and 227 respectively. Using the battery saving short cycle time for active reception, the Luggage location unit 201 is enabled to operate with such small coin shaped batteries 221 & 223. The entire indicator unit 151 can be about four inches long and about one and a half inches wide. Again, it should ideally become commercially available with as many luggage location units 41 as it is enabled to show receipt of associated coded signals to show presence within an aircraft.

FIG. 10 is a rear view of the baggage location unit 201 of FIG. 9 and illustrating the nondescript nature of the housing.

FIG. 11 is a side view of the baggage location unit 201 of FIGS. 9 and 10 and showing the slimline construction and how accessible the switch 219 is to the touch.

Figure 12:
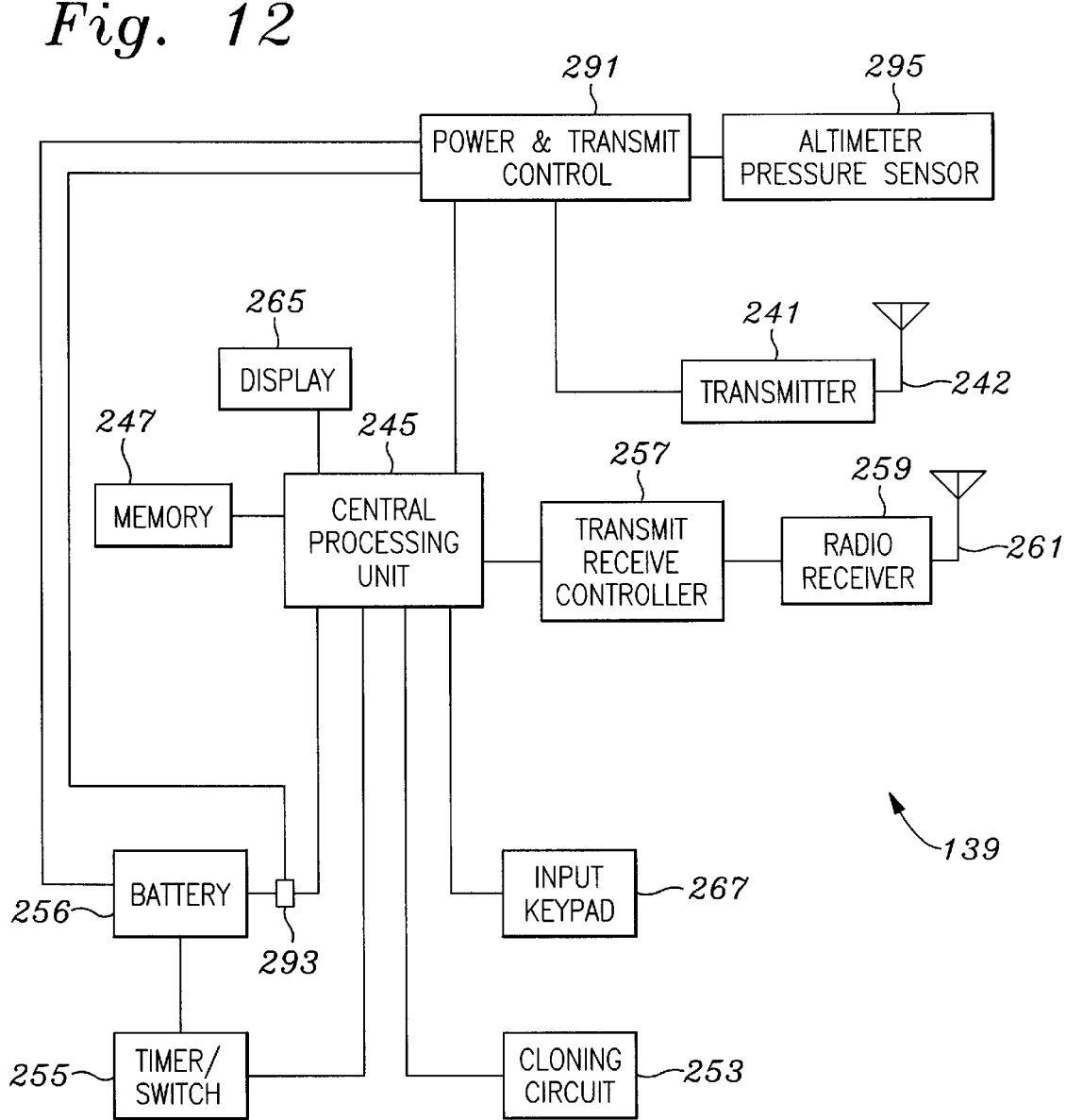
FIG. 12 is a block diagram of a full capability programmable equipment element which is shown with enough elements to be a cell telephone or other PED, and including components to illustrate that it may be any transceiver or any receiver, and further illustrating integral or detached control operation.

Referring to FIG. 12, schematic diagram of a PED 139 illustrates units which are sufficient to show cellular telephone operation, but cover a wide range of PEDs especially those having transmit and receive capability. Keep in mind that FIG. 12 is but one possible realization for PED 139 and a wide number of other variations are possible. A TRANSMITTER 241 is shown as being connected to an antenna 242 and to a TRANSMIT CONTROLLER 243. The TRANSMIT CONTROLLER 243 can be of a type which can modulate the TRANSMITTER 241 in order to control output frequency, transmit mode, telephonic roaming information and also to select the method upon which information is transmitted or modulated with respect to each mode in the case of a complex transceiver. The TRANSMIT CONTROLLER 243 is connected to a CENTRAL PROCESSING UNIT 245 and may be completely programmable. CENTRAL PROCESSING UNIT 245 may have a variety of modes of operation including standby, sleep, and may be able to selectively automatically operate in high and low emissive modes. CENTRAL PROCESSING UNIT 245 is connected to the input keypad 267 and to the battery 256. CENTRAL PROCESSING UNIT 245 may have a connected MEMORY 247, and is also connected to the display 265. A CLONING CIRCUIT 253 may also be provided for automatic interrogative programming with respect to analog and digital cellular phones, and pagers.

For really efficient operation, the PED 139 may provide a TIMER/SWITCH block 255 which is connected to both a battery 256 as well as the CENTRAL PROCESSING UNIT 245. In this connective configuration the TIMER/SWITCH block 255 can provide a very low battery drain and can initiate and control a sleep or standby mode of the CENTRAL PROCESSING UNIT 245 without having to use the timer normally present in the CENTRAL PROCESSING UNIT 245 in order to control the periodic on and off functions. This is an example of hybrid control which is neither wholly external in its operation with respect to the CENTRAL PROCESSING UNIT 245 but yet neither wholly internal within the CENTRAL PROCESSING UNIT 245. Where CENTRAL PROCESSING UNIT 245 may have a clock operating at a frequency which is in danger of interfering with the aircraft operations, for example, an internal control of standby, shut down will not prevent emissions as the clock in the CENTRAL PROCESSING UNIT 245 keeps on running.

For an example of the advantages of a hybrid control, in order to conserve energy, the TIMER/SWITCH block 255 can be set through programming provided to the CENTRAL PROCESSING UNIT 245 to turn on or off the CENTRAL PROCESSING UNIT 245 in response to signals, conditions, elapse of time and the like, and to initialize the the CENTRAL PROCESSING UNIT 245 only during limited times and the like, as in querying to pick up voice box messages, etc. The aspects of the TIMER/SWITCH to be emphasized is that it operates with no significant external input, but can energize the CENTRAL PROCESSING UNIT 245 to enable it to intermittently go active and gather inputs. Such functioning should be, within the discussion of the invention, circumventable, with a more external overriding control.

A TRANSMIT RECEIVE CONTROLLER 257 may also be connected to the CENTRAL PROCESSING UNIT 245 to receive commands from a RADIO RECEIVER 259, which is also preferably connected to an antenna 261. The RADIO RECEIVER 259 may be a pager receiver, cell phone receiver or a receiver for receiving signals on several communication frequencies.

Also seen in FIG. 12 is a DISPLAY 265, and an input keypad 267 as is normally also connected to the CENTRAL PROCESSING UNIT 245.

At the top of FIG. 12, also seen is a POWER TRANSMIT & CONTROL block 291. POWER TRANSMIT & CONTROL block 291 is connected straight back into the battery 256, and is also connected to a switch 293 which controls the power line between the battery 256 and the CENTRAL PROCESSING UNIT block 245. This accomplishes two objectives. First, it insures that the control which can control the remainder of the circuit will not have its power interrupted and second it insures that it will have the ability to shut down what may in many instances be a CENTRAL PROCESSING UNIT block 245 which may be otherwise consuming too much power because of its programming instructions to perform tasks which might either controvert the programming for shut down or may not have an ability to shut down. This may be particularly necessary where a PED has no external access to accept standby, or shut down commands. Even where a CENTRAL PROCESSING UNIT 245 is programmable to be consistent with the shutdown routine, it may have other tasks and protocols which are not conserving of power. This enables the POWER TRANSMIT & CONTROL block 291 to be constructed with a hard wired microprocessor which can operated over extended times with minimum power.

An ALTIMETER PRESSURE SENSOR block 295 is connected to the POWER TRANSMIT & CONTROL block 291 to provide direct pressure date to the POWER TRANSMIT & CONTROL block 291 without any interference.

A VIBRATION SENSOR block 296 is also connected to the POWER TRANSMIT & CONTROL block 291 to provide vibration data to the POWER TRANSMIT & CONTROL block 291 typically based upon an aircraft engine's output, wind noise, and airframe natural harmonics. All major vibrational footprints are pre-programmed, including the vibrational characteristics when the flaps are down, as well as the vibrational signature produced by thruster reverse and braking.

ACCELERATION SENSOR block 297 is also connected to the POWER TRANSMIT & CONTROL block 291 to provide acceleration data to the POWER TRANSMIT & CONTROL block 291 typically based upon an aircraft's upward, downward and turning acceleration. All major acceleration footprints are pre-programmed, including ranges expected to be encountered on takeoff, landing, and in holding pattern. The signatures may even be so specific that they are correlated to identifiable acceleration vibrational characteristics of known aircraft in terms of their ability to assume positive and negative acceleration over time, as well as the acceleration on takeoff and deceleration on landing.

ALTIMETER PRESSURE SENSOR block 295, VIBRATION SENSOR block 296, and ACCELERATION SENSOR block 297, are all flight profile detectors and may be used singly or in combination with each other for even more specific profiles. They may also be used in combination to identify the type of aircraft on which they are used and thus select from a pre-programmed routine which has the best fit for the characteristics likely to be encountered.

The POWER TRANSMIT & CONTROL block 291 is also directly connected to the transmitter 241 in order to control the times during which the transmitter transmits. The POWER TRANSMIT & CONTROL block 291 can be configured to enable non-interfering operation so long as no control is needed. The advantage of the configuration of FIG. 12 is that where the CENTRAL PROCESSING UNIT block 245 is provided as a pre-programmed unit, the POWER TRANSMIT & CONTROL block 291 can achieve its objectives without having to be back integrated into the CENTRAL PROCESSING UNIT block 245 with regard to either circuitry or programming code.

As has been stated above, a main problem with electronic equipment, and particularly communication systems, is both power management, transmit management, and emissions management. Depending upon the type of emissions present, some personal electronic equipment can only be effectively danger neutralized by complete power shut off. Others can have both their power managed as well as emissions managed where they have any sort of transmit mode, intended or unintended.

For personal equipment carried aboard an aircraft, causing such equipment to become responsive to the aircraft flight cycle is but one way to provide a "soft" management technique. The "soft" management technique is applicable when there exists times during any operational cycle where there is an indication that the cycle has begun, but that the danger prone part of the cycle is not present. At this time in the cycle, and given that the next portion of the cycle, for example, is the danger prone part of the cycle, emissions and power operation may be curtailed while probing for the initiation or appearance of the fully danger prone part of the cycle.

As by example only, aircraft are pre-pressurized to a pressure equivalent to about two hundred feet below the airport elevation, then once the aircraft ascends, the cabin pressure will reduce equivalent to a climb in altitude. How fast and high the cabin equivalent altitude becomes depends upon a variety of factors such as departing airport elevation, reuse altitude and landing elevation. Put another way, all aircraft do not start out or end up landing in the lower altitudes.

For example, takeoff from Denver will cause the cabin pressure equivalent altitude to climb much slower than a departure from Los Angeles because the cabin already has or starts with a pressure equivalent to about a five thousand foot altitude. Also if the aircraft is cruising at twenty six thousand feet, the cabin will not climb as high as it otherwise would if the aircraft was flying at forty one thousand feet in altitude.

The one constant factor, within the variations mentioned, is that all pressurized airplanes will land with the cabin at two hundred feet below field elevation so that if the aircraft lands at an airport with a field elevation of eight hundred sixty feet, the cabin will be at about six hundred sixty feet at touchdown.

There are three different options for shut off within a first footprint sequence. One is a pressure change equivalent to a climb after takeoff of about 3500 feet within 15 minutes. This will occur nowhere else other than an aircraft. For example, three thousand five hundred (3500) feet is equivalent to a 350 story building. A second option, within the first sequence, for shutoff is a pressure change equivalent to a one thousand foot climb within a 30 minute time period while at a cabin ambient pressure equivalent to an altitude of at least six thousand (6000) feet during any part of the 30 minute time period. Both conditions take to account take offs from high altitude airports such as Denver where the cabin pressure may not change equivalent to a climb of 3500 feet because the cabin starts over five thousand feet, the Denver elevation. A third condition is a static cabin pressure equivalent to an altitude of 7100 feet as this is a condition which most certainly indicates fully a flight condition. All altitudes stated are approximate.

At the fringe of the onset of either of these conditions, the mathematical probability is that the condition may not fully fit a 3500 foot altitude change over a full 15 minutes, or the condition may not fully fit a 1000 foot altitude change over 30 minutes along with an overall static pressure equivalent to a 6000 foot elevation during the 1000 foot altitude change, or the condition will not yet arrive at the static pressure equivalent to a 7100 foot elevation. Thus a measurement or computation made at the onset of this condition may miss the condition as all of the elements necessary to measure the condition may not yet be present. All condition testing is step independent.

One or more secondary measurements can be made to reduce activity at a condition at which there is a likelihood of the initiation of the flight sequence. One secondary measurement is the detection of any change in altitude of approximately one hundred forty feet (140 ft.) Within a two minute period. When this condition is reached, the operation may change. For example, where a controller on the PED may take measurements every twenty seconds, a change in altitude of one hundred forty feet may extend a cycle of the PED or delay its measurement by an additional minute. All modes are possible, including the ability to simultaneously monitor multiple phases and altitude rates at the same time.

The communication system can still come on again, albeit later, and can be typically overridden by the shutoff condition.

Another secondary measurement effect is that a change in pressure representing a change in altitude of about six hundred feet (600 ft.) in a time period of about 7 minutes is used to shut off transmitter activity, or other pertinent activity in the PED 139 for 5 minutes.

Another secondary measurement effect is that a change in pressure representing a change in altitude of about sixty feet (60 ft.) in a time period of about 2 minutes is used to shut off transmitter activity, or other pertinent activity in the PED 139 for thirty seconds.

All of the three described secondary measurement effects may be overridden by any of the shutoff conditions described, such as the 3500 feet increase in altitude within 15 minutes. All of the shutoff conditions can be programmed to be overridden if the user has manual access and control of the personal electronic equipment. In some cases, where equipment are absolutely forbidden to be operated, such as cell phone operation on an aircraft, it may be mandated that the most severe condition may not be overridden. This may be mandated by law, where so chosen, to prevent unauthorized and likely covert operation of cell phones on aircraft. This is not to say that most conventional cell phones work on high altitude aircraft, but passengers are likely to experiment, attempt, etc. Some laws and rules have provided for incarceration for use of a cell phone while a commercial aircraft is en route. However, it is believed that allowing user override of the activity reduction and shutoff conditions is perfectly permissible.

So for example, where an aircraft has a cabin equivalent pressure elevation of 1000 feet and just begins its climb, it will not meet either of the two complete shutdown measurement quantity conditions. Once it changes altitude one hundred forty feet (140 ft.) within 2 minutes, one minute suspension of system activity, such as transmitter output or receiver tuning, etc. will be added to the equipment activity. Altitude measurements, however, are not suspended. If, in addition, the aircraft has attained a change in pressure equivalent to an altitude change of six hundred feet (600 ft.) within this seven minute span, the system will go off for five minutes. Thus, the second secondary measurement effect will generally override the first. If during the five minute shut off period, either of the complete shutdown measurement quantities are measured, the system will shut off and stay shut off until it is either (1) manually re-activated or (2) a landing sequence, hereinafter described, is sensed. It is preferable that the controller and altimeter derive its power independently and be enabled to run either continuously or intermittently during the time that the system is shut off, especially so that the landing sequence can be sensed.

The landing sequence, when measured using pressure which may be equivalent to altitude is preferably a combination of three conditions all of which must be met in order to turn the device of the invention, or any personal electronics device, back on. Thus it may also be though generally better that the equipment stay off than to come on prematurely during the main part of flight.

The desired landing sequence involves occurrence of all three of the following conditions. First, a pressure rise equivalent to a descent of two hundred feet (200 ft.) or more within a seven minute (7 minute) time period. If this condition is met, a second condition, following in time after the first condition is tested for which is a reduction in pressure equivalent to a climb or increase in altitude from about one hundred forty feet (140 ft.) to about two hundred eighty feet (280 ft.) within a span of four minutes. If the first and second conditions occur, a third condition, generally temporally following, but potentially allowing some overlap of temporal extent, which is a fairly constant pressure equating to generally level flight and within the altitude limits of ±one hundred feet (100 ft.) for a time period of three minutes. If all three of these conditions occur, the PED turns back on. A cancellation of a landing sequence will not permit all three conditions to be satisfied. If the PED comes back on and the aircraft begins to climb again, the system of the invention will again begin sensing for shut down as completely described above.

For cell phones, a profile may be selected to shut off such equipment, followed by the landing sequence requiring all three steps as set forth above. This is a second footprint which may be used as an alternative shut down condition, especially for cell phones, and may ideally include a pressure reduction equivalent to a cabin altitude climb of about three thousand five hundred feet (3500 ft.) within a fifteen minute time span. A second alternative shut down condition, within this second footprint, for cell phones may ideally include a pressure reduction associated with a one thousand foot (1000 ft.) climb within a time of about thirty minutes combined with a static cabin altitude of greater than about six thousand feet (6000 ft.). The cell phone would then shut off until the landing sequence.

Referring to FIG. 13, including the sub elements 13A, 13B and 13C, a block diagram illustrating the process above is seen, From a START block 301, the logic flows to a PRESSURE EQUATING TO 3500 FEET ALTITUDE RISE WITHIN A 15 MINUTE TIME PERIOD decision diamond 303. A YES result leads to a SHUT DOWN block 305, and then to a LANDING SEQUENCE block 307 where the logic of the POWER & TRANSMIT CONTROL 251 waits for a landing sequence of events, if such ever occurs. A NO result leads to a PRESSURE EQUATING TO 1000 FEET ALTITUDE RISE WITHIN 30 MINUTES WHILE AT AN ALTITUDE OF 6000 FEET OR HIGHER decision diamond 309. A YES result leads to leads to a SHUT DOWN block 305, and then also to a LANDING SEQUENCE block 307 where the logic of the POWER & TRANSMIT CONTROL 291 waits for a landing sequence of events, if such ever occurs.

A NO result from PRESSURE EQUATING TO 1000 FEET ALTITUDE RISE WHILE AT ALTITUDE OF 6000

FEET OR HIGHER decision diamond 309 leads to a PRESSURE EQUATING TO AN ALTITUDE OF ABOUT 7100 FEET ALTITUDE decision diamond 310. A YES result leads to leads to a SHUT DOWN block 305, and then also to LANDING SEQUENCE block 307. A NO result leads to a PRESSURE EQUATING TO ANY CHANGE IN ALTITUDE OF 140 FEET WITHIN A TWO MINUTE TIME PERIOD decision diamond 311. A YES result leads to a DELAY TRANSMITTER ACTIVITY FOR AN ADDITIONAL MINUTE block 313 where the transmitter or other operational activity is time delayed, followed by a return of the logic flow back to the START block 301. A NO result leads to a PRESSURE EQUATING TO A CHANGE IN ALTITUDE OF 600 FEET WITHIN A SEVEN MINUTE TIME PERIOD decision diamond 315. A YES result leads to a HALT TRANSMITTER ACTIVITY FOR 5 MINUTES block 317 where the transmitter or other operational activity of the PED 139 is stopped for five minutes, followed by a return of the logic flow back to the START block 301.

A NO result leads to a PRESSURE EQUATING TO A CHANGE IN ALTITUDE OF 60 FEET WITHIN A TWO MINUTE TIME PERIOD decision diamond 319. A YES result leads to a HALT TRANSMITTER ACTIVITY FOR 30 SECONDS block 320 where the transmitter or other operational activity of the PED 139 is stopped or delayed for thirty seconds, followed by a return of the logic flow back to the START block 301. A NO result also leads to a return of the logic flow back to the START block 301, where the cascade of logic may start again.

From the LANDING SEQUENCE block 307 where the logic pointer arrives from the SHUT DOWN block 305, the logic strobes a series of three underlying decision diamonds with a NO result leading back to the LANDING SEQUENCE block 307. The first decision diamond is A PRESSURE RISE EQUIVALENT TO A DESCENT OF 200 HUNDRED FEET OR MORE IN WITHIN A SEVEN MINUTE TIME PERIOD decision diamond 321. Only a YES result leads to the next decision diamond, A PRESSURE REDUCTION EQUIVALENT TO A CLIMB OR INCREASE IN ALTITUDE FROM 140–280 FT. WITHIN ABOUT FOUR MINUTES decision diamond 323. From decision diamond 323, a YES result leads to A PRESSURE EQUIVALENT TO A GENERALLY LEVEL FLIGHT & WITHIN ALTITUDE LIMITS OF ABOUT ±100 FT. FOR ABOUT THREE MINUTES decision diamond 325. Only a YES result at decision diamond 325 sends the logic to a TURN EQUIPMENT BACK ON command block 327.

TURN EQUIPMENT BACK ON command block 327 can also be reached from a manual override block 329 which is typically accessed by turning on and off a power button, or from a reset button, or the like. From TURN EQUIPMENT BACK ON command block 327 the logic proceeds directly to an END block 331 where the logic may either end, carry some protocol to restart or may lead back to the START block 301.

Figure 13A:
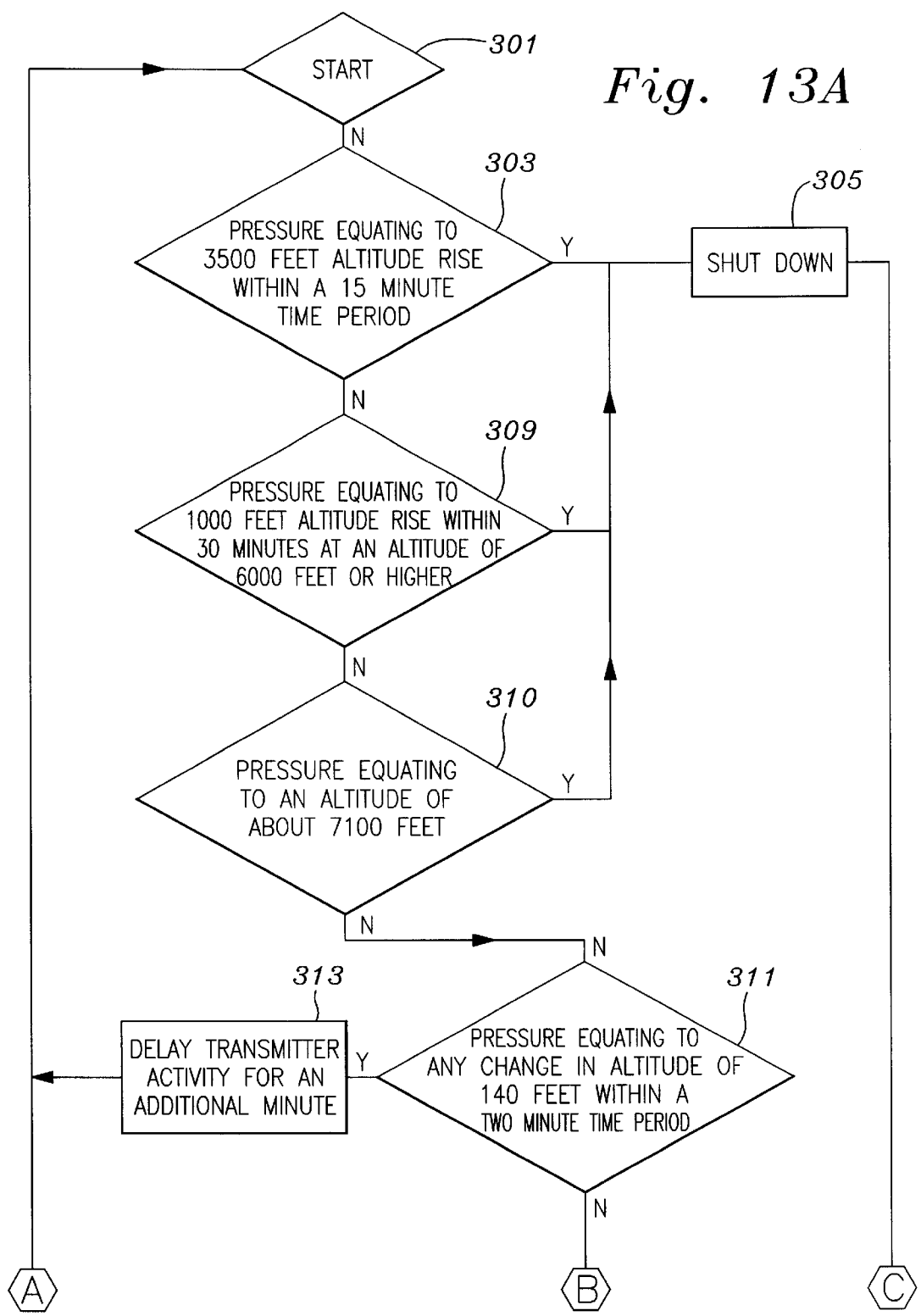
FIG. 13, as subdivided in to FIGS. 13A–13D for size and spacing, is a logic flow diagram illustrating one manner of programming approximate aircraft pressure change profiles with an altimeter input.
Figure 13B:
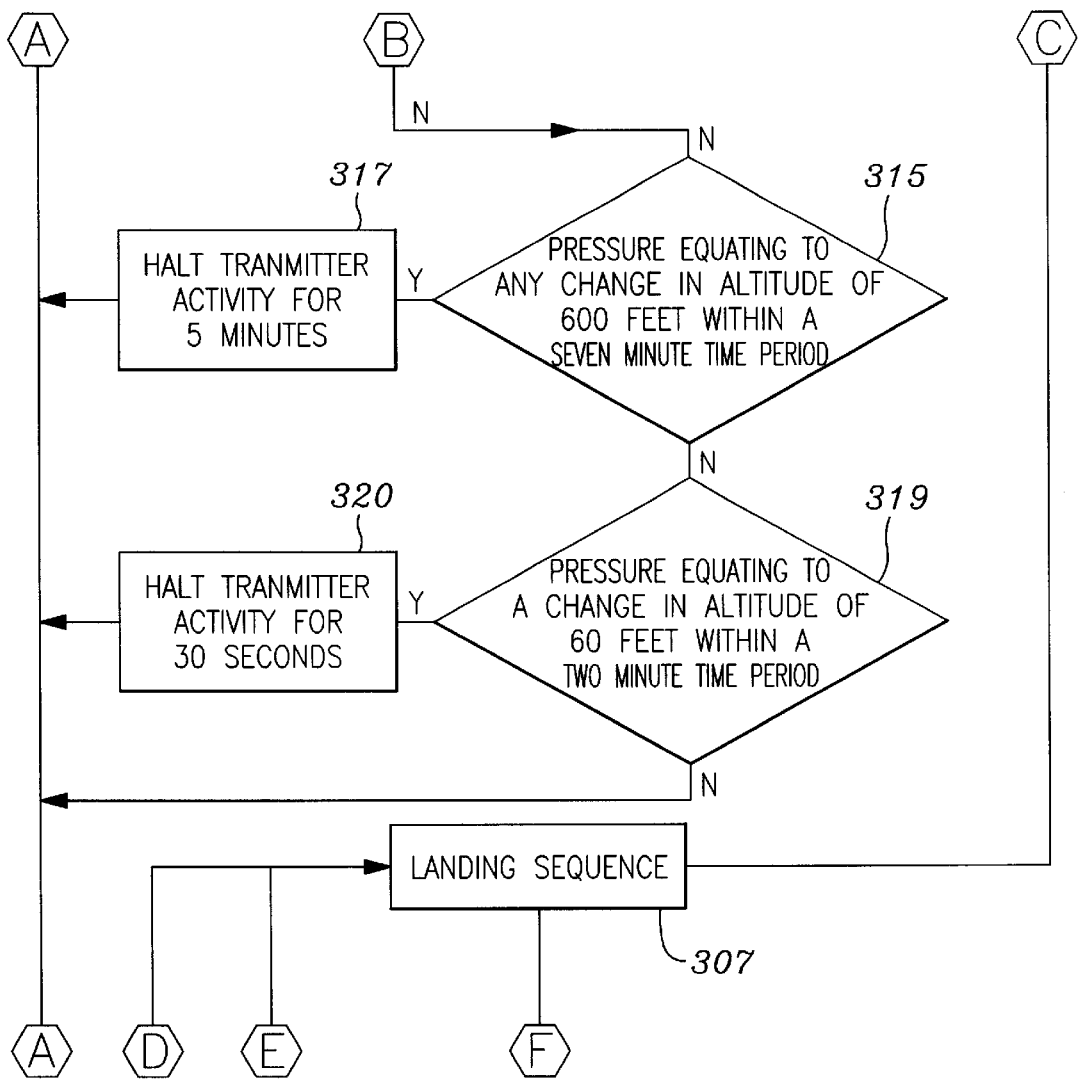
Figure 13C:
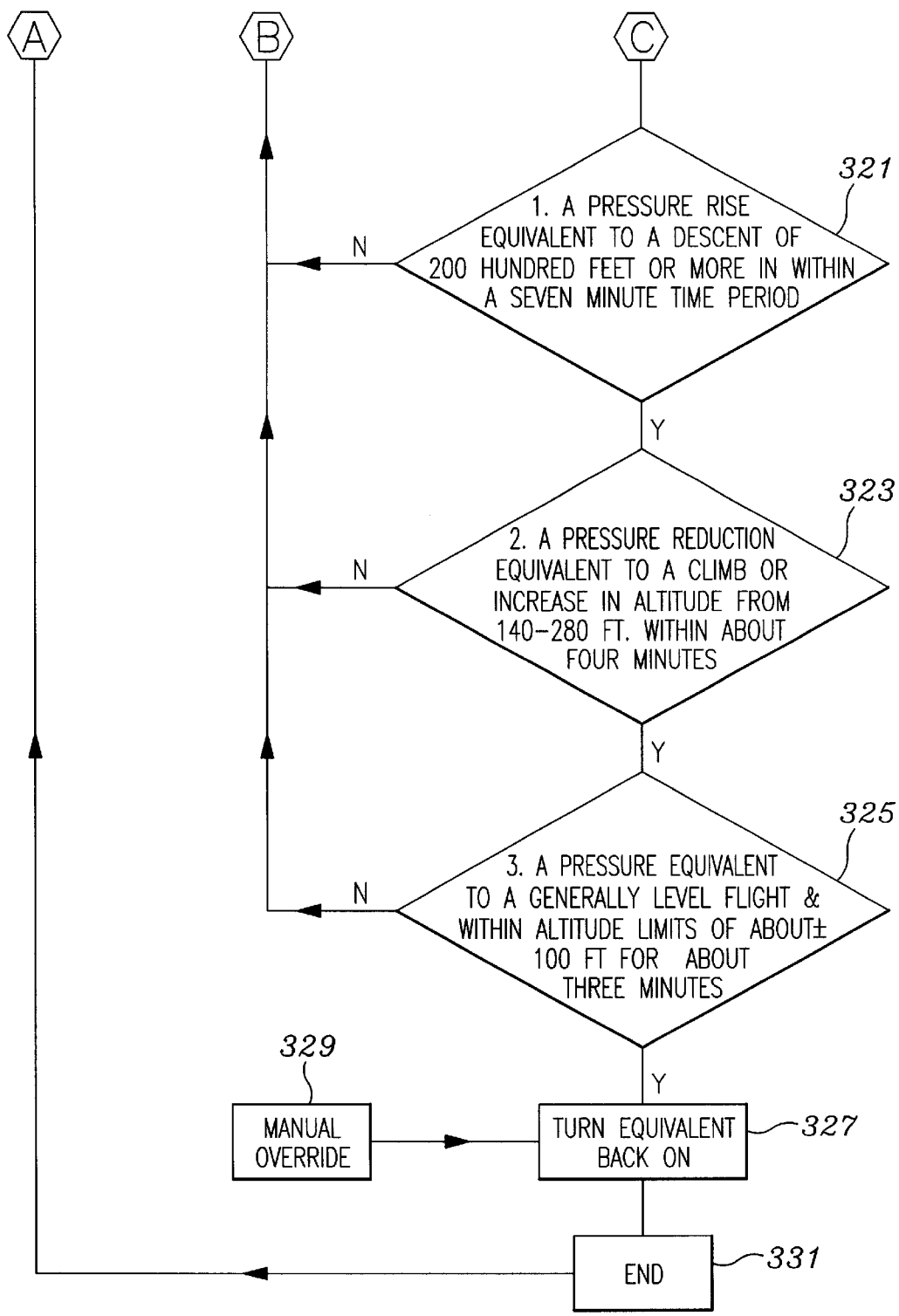
Figure 13D:
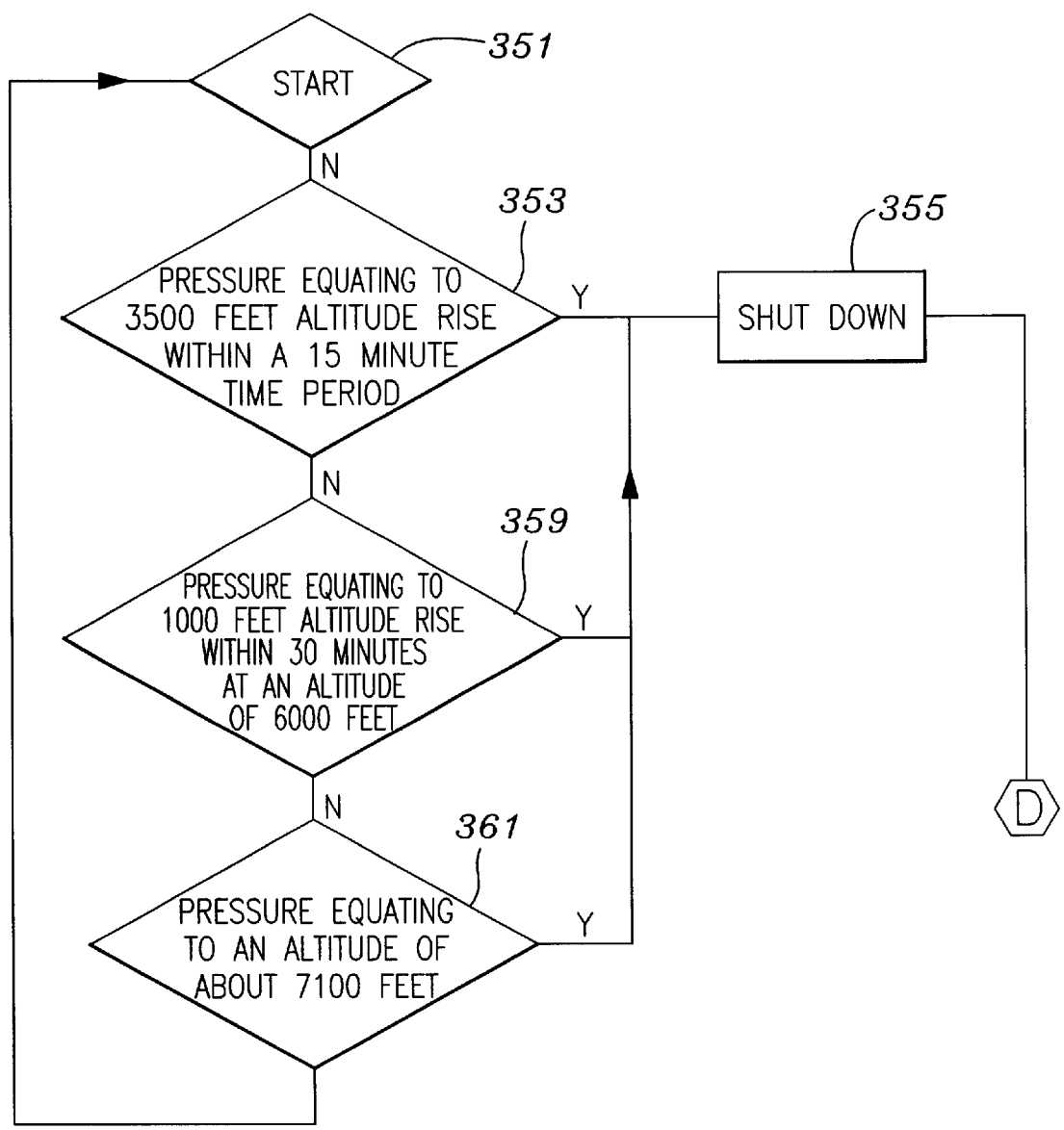

Referring to FIG. 13C, an alternative starting point describes a second profile especially useful with cell phones, and which preferably shows an example of parallel processing, where the shut down conditions are sought without any intervening PED delay conditions. From a START block 351, the logic flows to a PRESSURE EQUATING TO 3500 FEET ALTITUDE RISE WITHIN A 15 MINUTE TIME PERIOD decision diamond 353. A YES result leads to a SHUT DOWN block 355, and then to a LANDING SEQUENCE block 307 seen at FIG. 13B. A NO result leads to a PRESSURE EQUATING TO 1000 FEET ALTITUDE RISE WITHIN 15 MINUTES AT AN ALTITUDE OF 6000 FEET OR HIGHER decision diamond 359. A YES result leads to leads to a SHUT DOWN block 355, and then also to LANDING SEQUENCE block 307. A NO result leads to a PRESSURE EQUATING TO AN ALTITUDE OF ABOUT 7100 FEET decision diamond 361. A YES result leads to leads to a SHUT DOWN block 355, and then also to LANDING SEQUENCE block 307. A NO result leads back to START block 351.

While the present invention has been described in terms of a proximity communication system and power control system and structure as well as structures and methods for verifying the proximity and location of baggage in order to enable early notification and action to avoid loss as well as to recover same after some loss has occurred, one skilled in the art will realize that the structure and techniques of the present invention can be applied to many similar devices. The present invention may be applied in any situation where proximity, identification and location of objects is needed.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A luggage tracking system comprising:
   a luggage location unit having a transmitter for transmitting an identifying code and having a housing for carriage inside a unit of luggage within a fuselage of an aircraft;
   a flight profile detector in communication with said transmitter for inhibiting operation of said transmitter during at least part of a flight sequence; and
   an indicator unit having a receiver for receiving said identifying code from within said fuselage and for indicating receipt of said identifying code to indicate a presence of said luggage location unit and thus the unit of luggage within which it is carried.

2. The luggage tracking system of claim 1 wherein said flight profile detector is programmed to sense at least one of vibration, acceleration and pressure.

3. The luggage tracking system of claim 1 wherein at least one of said luggage location unit and said indicator unit includes a receiver and a transmitter respectively such that said at least one of said luggage location unit and said indicator unit is capable of transceiving.

4. The luggage tracking system of claim 3 wherein said luggage location unit includes a receiver capable of receiving commands to control said transmitter of said luggage location unit.

5. The luggage tracking system of claim 3 wherein said indicator unit includes a transmitter capable of communicating with and transmitting commands to said receiver of said luggage location unit.

6. The luggage tracking system of claim 5 wherein said indicator unit is capable of commanding said luggage location unit to alter at least one of its transmitter timing, transmitter mode, antenna phasing and transmitter frequencies.

7. The luggage tracking system of claim 1 and wherein said luggage location unit is a first luggage location unit, and further comprising at least a second luggage location unit, each of said at least a second location unit having an associated transmitter for transmitting an identifying code particular to each of said respective first and said at least a second location unit.

8. A method of luggage tracking comprising the steps of:

turning on a luggage location unit having at least a transmitter which is disabled based upon detection of flight profile so that said transmitter will not operate over the majority of a flight cycle; and inserting said luggage location unit inside a unit of luggage;

presenting said unit of luggage to be carried by an airline on an aircraft;

taking an indicator unit having at least a receiver on board said aircraft; and receiving a signal from said luggage location unit to verify a presence of said unit of luggage on board said aircraft.

9. The method of luggage tracking as recited in claim 8 wherein said flight profile is detected based upon at least one of vibration, acceleration and pressure.

10. A method of luggage tracking comprising the steps of:

turning on a luggage location unit having at least a transmitter which is disabled based upon detection of flight profile so that said transmitter will not operate over the majority of a flight cycle; and inserting said luggage location unit inside a unit of luggage;

presenting said unit of luggage to be carried by an airline on at least one aircraft;

taking an indicator unit having at least a receiver to the vicinity of a luggage retrieval point once said unit of luggage is taken off of said at least one aircraft; and receiving a signal from said luggage location unit to verify a presence of said unit of luggage in the vicinity of said luggage retrieval point.

11. The method of luggage tracking as recited in claim 10 wherein said unit of luggage is at least a first unit of luggage and at least a second unit of luggage and wherein said luggage location unit is at least a first luggage location unit and at least a second luggage location unit wherein said at least a first luggage location unit is inserted into said at least a first unit of luggage and wherein said at least a second luggage location unit is inserted into said at least a second unit of luggage wherein said receiving a signal from said luggage location unit step is for verifying a presence of said at least a first unit of luggage and at least a second unit of luggage in the vicinity of said luggage retrieval point.

* * * * *